(12) United States Patent
Sato et al.

(10) Patent No.: US 7,086,623 B2
(45) Date of Patent: Aug. 8, 2006

(54) LEADER TAPE AND MAGNETIC TAPE CARTRIDGE

(75) Inventors: Masami Sato, Kanagawa (JP); Tadashi Ishiguro, Kanagawa (JP); Satoru Hayakawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 262 days.

(21) Appl. No.: 10/775,059

(22) Filed: Feb. 11, 2004

(65) Prior Publication Data

US 2004/0159733 A1 Aug. 19, 2004

(30) Foreign Application Priority Data

Feb. 13, 2003 (JP) .......................... P. 2003-035412

(51) Int. Cl.
*G11B 23/107* (2006.01)
(52) U.S. Cl. .................... 242/348.2; 360/132
(58) Field of Classification Search ............... 242/348, 242/348.2; 360/132
See application file for complete search history.

(56) References Cited

U.S. PATENT DOCUMENTS 5,433,989 A * 7/1995 Hanai ......................... 428/141
5,455,104 A * 10/1995 Sekiguchi et al. .......... 428/212
6,759,150 B1 * 7/2004 Suzuki et al. ............ 428/844.8

FOREIGN PATENT DOCUMENTS

JP 1-224916 * 9/1989
JP 2001-110164 A 4/2001

* cited by examiner

*Primary Examiner*—John Q. Nguyen
(74) *Attorney, Agent, or Firm*—Sughrue Mion, PLLC

(57) ABSTRACT

A leader tape having: a support; an upper layer containing a powder, a binder, and a lubricant; and a lower layer containing a powder, a binder, and a lubricant which is at least 1.12 times as much as the lubricant of the upper layer; wherein the support, the lower layer, and the upper layer is in this order.

11 Claims, 2 Drawing Sheets

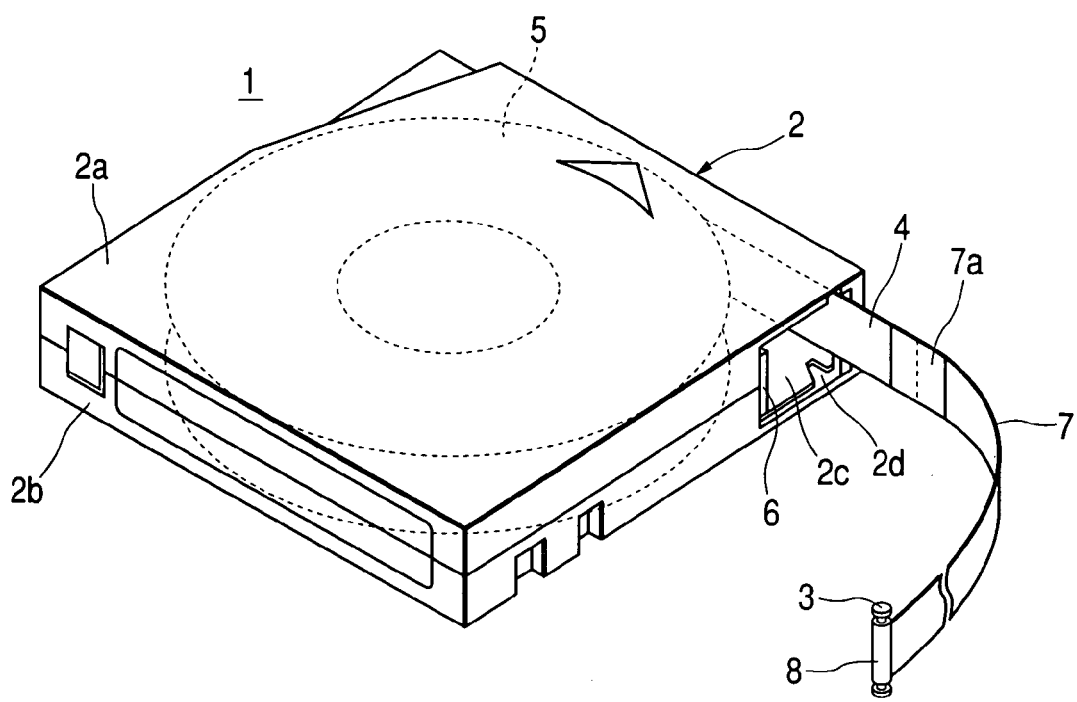
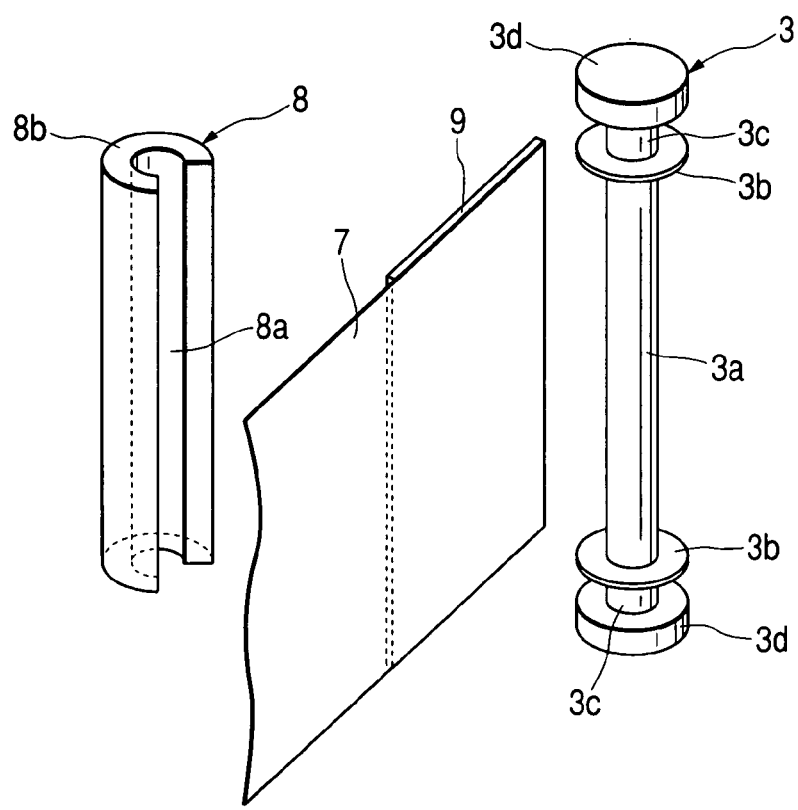

LEADER TAPE AND MAGNETIC TAPE CARTRIDGE

FIELD OF THE INVENTION

The present invention relates to a leader tape and a magnetic tape cartridge having a cartridge case which accommodates a single reel wound with a magnetic tape spliced to a leader tape relating to the invention so that the reel is rotatable.

BACKGROUND OF THE INVENTION

Hitherto, a magnetic tape cartridge of the type which has a single reel on which a magnetic tape is wound and a cartridge case which accommodates the reel so as to permit rotation of the reel has been known as a magnetic tape cartridge used as a recording medium installable in external storage for computers, such as LTO (Linear Tape-Open). Such a magnetic tape is used for storage of computer data, and important information is stored thereon. Therefore, such a tape cartridge is structured not only to prevent troubles, such as a tape jam, from occurring but also to avoid accidental drawing of magnetic tape from the cartridge.

Further, the forward end of the magnetic tape is fixed to a leader member for drawing out the tape, such as a leader pin or a leader block, or spliced to a leader tape which is made of a relatively hard plastic material and has engaging holes made in its front. And a drive is structured so as to perform load/unload (drawing/winding) of magnetic tape by holding the leader member or the leader tape front with a holding member installed on the side of a record playback unit and drawing out the magnetic tape.

In performing the load/unload operation by drawing the magnetic tape into the magnetic record playback unit in the foregoing manner and winding the tape front on a machine reel in the unit, the tape front is pulled while coming in contact with a tape guide and a magnetic head placed on the running path in a state that accurate positioning is not made yet. As a result, the tape front is subject to damage, so reinforcement thereof is preferable. Thus, it has been carried out to splice a leader tape higher in strength than a magnetic tape to the forward end of the magnetic tape (as disclosed, e.g., in JP-A-2001-110164).

In addition, the leader tape used is generally a magnetic tape having a single magnetic layer.

Therefore, when a magnetic tape cartridge is mounted in an LTO drive, the leader tape surface rubbing against the running system of the LTO drive comes to be scratched while repeating load/unload over and over again, and powdery shavings stick to the running system. The shavings stuck on the running system are transferred to the magnetic tape surface and cause a problem of increase in tape dropouts.

SUMMARY OF THE INVENTION

A problem of the invention is to provide a leader tape which enables a magnetic tape cartridge to control scratches on the leader tape surface and reduce dropouts on the magnetic tape even when the tape running is repeated over and over again, and a magnetic tape cartridge using the aforesaid leader tape.

The invention includes leader tapes and a magnetic tape cartridge as described below:

(1). A leader tape containing:

a support;

an upper layer containing a powder, a binder, and a lubricant; and a lower layer containing a powder, a binder, and a lubricant which is at least 1.12 times as much as the lubricant of the upper layer;

wherein the support, the lower layer, and the upper layer is in this order.

(2). The leader tape according to item (1), wherein the lubricant of the lower layer is 1.12 to 1.34 times as much as the lubricant of the upper layer.

(3). The leader tape according to item (1), wherein the lubricant is at least one selected from the group consisting of fatty acids, fatty acid esters and fatty acid amides.

(4). The leader tape according to item (1), wherein the support has a elasticity modulus of length direction of 630 kg/mm$^2$ or below, and a elasticity modulus of width direction of 580 kg/mm$^2$ or below.

(5). The leader tape according to item (1), which has a thickness of 15.2 to 20.0 μm.

(6). The leader tape according to item (1), wherein the upper layer has a thickness of 0.1 to 2.0 μm.

(7). The leader tape according to item (1), wherein the lower layer has a thickness of 1.0 to 3.0 μm.

(8). The leader tape according to item (1), wherein the support has a thickness of 12 to 16 μm.

(9). The leader tape according to item (1), wherein the upper layer has a center-line average surface roughness of 5.0 nm or below.

(10). The leader tape according to item (1), wherein the support is provided with a backing layer on the other side of the lower and the upper layers, and the upper layer and the backing layer each has a surface electrical resistance of $10^{10}$ Ω/sq or below.

(11). The leader tape according to item (1) wherein at least one of the upper layer, the lower layer, and the backing layer contains an electrically conductive powder.

(12). A magnetic tape cartridge containing:

a cartridge case;

a reel provided in the cartridge case so that the reel is capable of rotating;

a magnetic tape wound on the real; and a leader tape containing: a support; an upper layer containing a powder, a binder, and a lubricant; and a lower layer containing a powder, a binder, and a lubricant which is at least 1.12 times as much as the lubricant of the upper layer; wherein the support, the lower layer, and the upper layer is in this order; wherein one end of the magnetic tape is capable of being drawn from the cartridge, and the one end of the magnetic tape is connected to the leader tape.

BRIEF DESCRIPTION OF THE DRAWING

FIG. 1 is an oblique perspective figure showing a state in which the magnetic tape is drawn out of a magnetic tape cartridge according to an embodiment of the invention.

FIG. 2 is an oblique perspective figure showing a disassembled state of a leader pin-fixed section.

DESCRIPTION OF REFERENCE NUMERALS AND SIGNS

Figure 3:
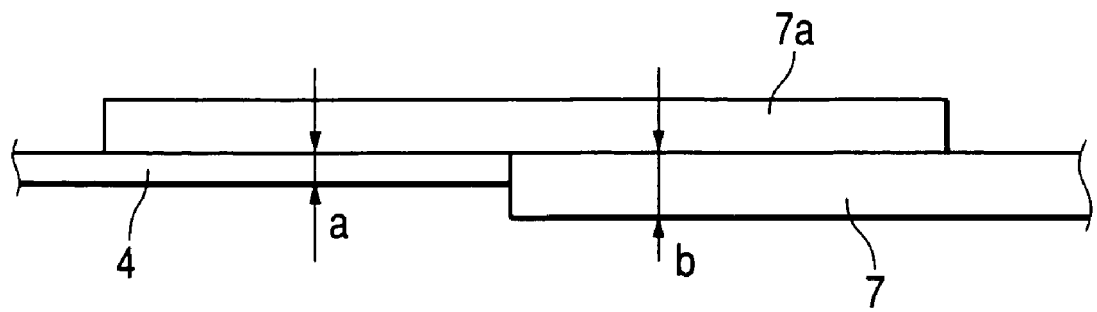
FIG. 3 is a plain view of a leader tape-spliced part of the magnetic tape.

1. Magnetic tape cartridge
2. Cartridge case
2c. Aperture section
3. Leader pin
3a. Clamp part
4. Magnetic tape
5. Reel
7. Leader tape
7a. Splicing tape
8. Clip
9. Reinforcing tape
10. Magnetic record playback unit
11. Leader block
12. Machine reel
15. Magnetic head
16. Tape guide

DETAILED DESCRIPTION OF THE INVENTION

The present leader tape has a double-layer structure and contains a lubricant in a larger amount in a lower layer than in an upper layer. As a result, migration of the lubricant from the lower layer to the upper layer occurs whenever the lubricant gets short in the surface part of the upper layer by load/unload repetitions, and provides compensation for lubricant shortage at the upper layer surface. Thus, an increase in friction force of the upper layer at the time of running is suppressed to result in reduction in shavings of the upper layer, so the magnetic tape cartridge using the present leader tape can achieve reduction in dropouts on the magnetic tape.

The invention is illustrated below in greater detail.

[Leader Tape]

Each of the lower and upper layers provided on a support contains at least a lubricant, a powder and a binder.

Although the lower layer and the upper layer (collectively referred to as the double layer, too) may be provided on only one side or both sides of a support, it is preferable to provide them on at least the side where the magnetic tape is brought into contact with a magnetic head. On the side opposite to the double layer side, on the other hand, the support may be provided with a single layer containing a powder and a binder or it may not be provided with any coating layer.

The compositions of the lower layer and the upper layer may be the same or different, except for the lubricant. However, it is appropriate to design compositions of these two layers so that replenishment of the upper layer with a lubricant from the lower layer can be attained in a satisfactory condition. The amount of the lubricant added to the lower layer is at least 1.12 times, preferably 1.12 to 1.34 times, larger than that added to the upper layer.

The term "lubricant" used in the invention is intended to include fatty acids, fatty acid esters and fatty acid amides.

It is appropriate that these lubricant constituents be added to the upper layer in proportions of fatty acids/fatty acid esters/fatty acid amides =(0.1–1.1)/(0.5–3.5)/(0–0.5), preferably (0.4–0.6)/(1.0–2.0)/(0–0.30), based on 100 parts by weight of powder. In the lower layer, on the other hand, the suitable proportions are in the range of fatty acids/fatty acid esters/fatty acid amides =(0.05–3.0)/(0.5–2.0)/(0–0.5), preferably (0.05–0.20)/(0.5–1.0)/(0–0.30), based on 100 parts by weight of powder.

The powder added to the double layer may be an inorganic powder or an organic powder. Examples of an inorganic powder include powders of metals and metal oxides, and those of an organic powder include powders of resins.

The suitable total thickness of the leader tape is from 15.2 to 20.0 µm, preferably from 16.5 to 17.5 µm.

The suitable thickness of the upper layer is from 0.1 to 2.0 µm, preferably from 0.5 to 1.0 µm. The suitable thickness of the lower layer is from 1.0 to 3.0 µm, preferably 1.6 to 2.0 µm. The suitable thickness of the support is from 12 to 16 µm, preferably from 13 to 15 µm.

It is preferable that the upper layer of the leader tape has a center-line average surface roughness Ra of 5.0 nm or below. By having such a surface roughness, the leader tape can exert a great clamping force on a leader member, and besides, it can produce an effect of cleaning a magnetic head. Additionally, when a reinforcing tape is bonded to the fixing part of the leader tape to the leader member, the clamping force can further be strengthened and anti-bent strength can also be heightened.

The center-line average surface roughness Ra of the upper layer can be adjusted to the aforesaid extent by making the support have a properly selected value of center-line average surface roughness Ra on the side where the upper layer is to be provided, by selecting sizes of powders used for the lower layer and the upper layer, or by selecting the linear pressure or roll's surface properties in surface forming treatment, such as calendering.

Further, it is preferable that the support of the leader tape is provided with a backing layer on the side opposite to the double layer's side. The suitable surface electrical resistance of the upper layer and that of the backing layer are each $10^{10}$ Ω/sq or below, preferably $10^9$ Ω/sq or below. By such adjustment of surface electrical resistance, the leader tape is prevented from bearing electrostatic charge and does not cause electrostatic damage to a magnetic head. As a result, the reliability is heightened, and besides, the magnetic tape cartridge formed by splicing a magnetic tape to a leader tape basically higher in strength than the magnetic tape can be increased in durability to withstand repeated operations for loading into and unloading from a magnetic record playback unit.

The control of the surface electrical resistance to the foregoing extent can be achieved by adding a conductive powder, such as carbon black, to at least one among the lower layer, the upper layer and the backing layer. For instance, carbon black is added to each of those layers in proportions of 1 to 20 parts by weight to 100 parts by weight of binder.

It is advantageous for the present leader tape to be a magnetic tape having as the lower layer a nonmagnetic layer containing an inorganic powder and a binder and as the upper layer a magnetic layer containing a ferromagnetic powder and a binder and a backing layer formed on the side opposite to these layers' side.

Then, magnetic tapes usable as the present leader tape are illustrated below in detail.

(Magnetic Layer)

<Binders for Magnetic Layer and Nonmagnetic Layer>

Binders usable for the magnetic layer and the nonmagnetic layer include hitherto known thermoplastic resins, thermosetting resins, reactive resins and mixtures of these resins. Thermoplastic resins usable as the binders are those having their glass transition temperatures in the range of −100 to 150° C., their number average molecular weights in the range of 1,000 to 200,000, preferably 10,000 to 100,000, and polymerization degrees of the order of 50–1,000.

Examples of such thermoplastic resins include homo- and copolymers containing constituent units derived from monomers, such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether; polyurethane resin; and various resins of rubber type. And examples of thermosetting resins or reactive resins include phenol resin, epoxy resin, polyurethane resin of cure type, urea resin, melamine resin, alkyd resin, acrylic reactive resin, formaldehyde resin, silicone resin, epoxy-polyamide resin, a mixture of polyester resin and isocyanate prepolymer, a mixture of polyesterpolyol and polyisocyanate, and a mixture of polyurethane and polyisocyanate. Details of these resins are described, e.g., in *Plastics Handbook*, published by Asakura Shoten. In addition, it is possible to use known electron beam-curable resins in each layer. Detailed explanation of such resins and manufacturing methods thereof can be found in JP-A-62-256219.

Although the resins as recited above can be used alone or as a combination of two or more thereof, the combination of polyurethane resin, polyisocyanate and at least one resin selected from the group consisting of vinyl chloride resin, vinyl chloride-vinyl acetate copolymer, vinyl chloride-vinyl acetate-vinyl alcohol terpolymer and vinyl chloride-vinyl acetate-maleic anhydride terpolymer is preferred over the others.

As the makeup of the polyurethane resin, known ones including polyesterpolyurethane, polyetherpolyurethane, polyetherpolyesterpolyurethane, polycarbonatepolyurethane, polyesterpolycarbonatepolyurethane and polycaprolactone-polyurethane can be adopted. For enhancing dispersibility and durability of all the binders recited above, it is appropriate that at least one polar group selected from —COOM, —SO$_3$M, —OSO$_3$M, —P=O(OM)$_2$, —O—P=O (OM)$_2$ (wherein M is a hydrogen atom or an alkali metal base), —OH, —NR$_2$, —N$^+$R$_3$ (wherein R is a hydrocarbon group), epoxy group, —SH or —CN be introduced into each binder by copolymerization or addition reaction on an as needed basis. The suitable content of such polar groups in each binder is from $10^{-1}$ to $10^{-8}$ mole/g, preferably from $10^{-2}$ to $10^{-6}$ mole/g.

The suitable number of hydroxyl groups contained in a polyurethane resin is from 3 to 20, preferably from 4 to 5, per molecule. When the number of hydroxyl groups in the resin is below 3, the resin's reactivity with a polyisocyanate curing agent is decreased, and thereby the strength and the durability of coatings tend to be lowered. When the number of hydroxyl groups in the resin is beyond 20, on the other hand, the resin's solubility and dispersibility in solvents are apt to be lowered. The number of hydroxyl groups contained in a polyurethane resin can be adjusted by using a compound trifunctional or higher with respect to the hydroxyl groups at the synthesis of the polyurethane resin. Examples of such a compound include trimethylolmethane, trimethylolpropane, trimellitic acid anhydride, glycerin, pentaerythritol, hexanetriol, branched polyester containing three or more hydroxyl groups as functional groups which is prepared from a dibasic acid derived from the polyesterpolyol disclosed in JP-B-6-64726 and this polyol compound used as a glycol component, and polyetherester. Of these compounds, the trifunctional compounds are preferred over the others. The tetrafunctional or higher compounds have a disadvantage of being liable to gel in the reaction process.

Examples of those binders usable in the invention include VAGH, VYHH, VMCH, VAGF, VAGD, VROH, VYES, VYNC, VMCC, XYHL, XYSG, PKHH, PKHJ, PKHC and PKFE, produced by Union Carbide Co.; MPR-TA, MPR-TA5, MPR-TAL, MPR-TSN, MPR-TMF, MPR-TS, MPR-TM and MPR-TAO, produced by Nissin Chemical Industry Co., Ltd.; 1000W, DX80, DX81, DX82, DX83 and 100FD, produced by Electro Chemical Industry Co., Ltd.; MR-104, MR-105, MR110, MR100, MR555 and 400X-110A, produced by ZEON CORP.; Nipporan N2301, N2302 and N2304, produced by Nippon Polyurethane Industry Co., Ltd.; Pandex T-5105, T-R3080 and T-5201, Barnoc D-400 and D-210-80, and Crysbon 6109 and 7209, produced by Dainippon Ink & Chemicals, Inc.; Vylon UR8200, UR8300, UR-8700, RV530 and RV280, produced by Toyobo Co.; Daiferamine 4020, 5020, 5100, 5300, 9020, 9022 and 7020 produced by Dainichiseika C. & C. Mfg.; MX5004 produced by Mitsubishi Chemical Industries Ltd.; Sanprene SP-150 producedby Sanyo Chemical Industries Co., Ltd.; and Saran F310 and F210, produced by Asahi Chemical Industry Co., Ltd.

Examples of polyisocyanate usable in the invention include isocyanates, such as tolylene diisocyanate, 4,4'-diphenylmethane diisocyanate (MDI), hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates and polyalcohols; and polyisocyanates as condensation products of isocyanates. Commercially available products of the isocyanates as recited above are, e.g., Colonate L, Colonate HL, Colonate 2030, Colonate 2031, Millionate MR and Millionate MTL (trade names, produced by Nippon Polyurethane Industry Co., Ltd.), Takenate D-102, Takenate D-110N, Takenate D-200 and Takenate D-202 (trade names, produced by Takeda Chemical Industries, Ltd.), and Desmodur L, Desmodur IL, Desmodur N and Desmodur HL (trade names, produced by Sumitomo Bayer Co., Ltd.). In each layer, these products may be used alone or in a state that two or more thereof are combined utilizing a difference in curing reactivity.

Such binders are used in a proportion ranging generally from 5 to 50 weight %, preferably from 10 to 30 weight %, to ferromagnetic powder in the magnetic layer or nonmagnetic powder in the nonmagnetic layer. When vinyl chloride resin is used as binder, the suitable proportion thereof is in the range of 5 to 30 weight %; when polyurethane resin is used as binder, the suitable proportion thereof is in the range of 2 to 20 weight %; and when polyisocyanate is used, the suitable proportion thereof is in the range of 2 to 20 weight %. And the combined use of these resins is advantageous. However, it is possible to use a combination of polyurethane with polyisocyanate alone in the case where a slight amount of chlorine evolved by dechlorination causes head corrosion.

As to such a magnetic tape, it goes without saying that the binder content, or the proportions of vinyl chloride resin, polyurethane resin, polyisocyanate and other resins in the total binder, or the molecular weights of resins forming the magnetic layer and the polar group contents in the resins, or the physical characteristics of the resins recited above may vary between the nonmagnetic layer and the magnetic layer, if needed. If anything, it is better to optimize those factors on a constituent layer basis. In this case, known arts of multiple magnetic layers are applicable. When the binder content varies from one constituent layer to another, for instance, an increase of a binder content in the magnetic layer is effective in reducing abrasion at the magnetic layer surface, while an increase of a binder content in the nonmagnetic layer can offer more flexibility and improve the touch of a head on the magnetic tape.

<Ferromagnetic Powder>

Ferromagnetic powders suitable for use in the magnetic layer are ferromagnetic alloy powders containing α-Fe as a main component. In addition to the specified atoms, these ferromagnetic powders may contain atoms of other species, such as atoms of Al, Si, S, Sc, Ca, Ti, V, Cr, Cu,. Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr or B. In particular, it is appropriate that the ferromagnetic powders contain atoms of at least one species selected from Al, Si, Ca, Y, Ba, La, Nd, Co, Ni or B, preferably selected from Co, Y or Al, in addition to atoms of α-Fe.

The fine powders of ferromagnetic alloys as mentioned above may contain small amounts of hydroxides or oxides. In producing fine powders of ferromagnetic alloys used in the invention, known methods can be adopted. Examples of a known production method applicable in the invention include a method of reducing an organic compound acid salt (mainly oxalates) with a reducing gas, such as hydrogen; a method of producing particulate Fe or Fe—Co via reduction of iron oxide with a reducing gas, such as hydrogen; a method of thermally decomposing a metal carbonyl compound; a method of adding a reducing agent, such as sodium borohydride, a hydrophosphite or hydrazine, to a water solution of ferromagnetic metal ions; and a method of evaporating a metal in an inert gas atmosphere of low pressure, thereby pulverizing the metal.

The ferromagnetic alloy powders produced by the methods as recited above may be subjected to any of slow oxidation treatments, including a method of drying the powders after immersion in an organic solvent, a method of immersing the powders in an organic solvent and thereinto blowing an oxygen-containing gas to form an oxide layer on the particle surface and further drying the particles, and a method of forming an oxide layer on the particle surface by controlling pressure shares of oxygen gas and inert gas without using any organic solvent.

Particulate hexagonal ferrite can also be used as the ferromagnetic powder used in the magnetic layer. Examples of such hexagonal ferrite include barium ferrite, strontium ferrite, lead ferrite, calcium ferrite and substitution products of each ferrite, such as Co-substituted ferrite. More specifically, magnetoplumbite-type barium or strontium ferrite, magnetoplumbite-type ferrite whose particle surfaces are covered with spinel, and a magnetoplumbite-type barium or strontium ferrite further containing in part a spinel phase are usable in the magnetic layer. The hexagonal ferrite of those types may be doped with various atoms other than the proper atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. Examples of a combination of elements generally usable as dopants include Co—Ti, Co—Ti—Zr, Co—Ti—Zn, Ni—Ti—Zn, Nb—Zn—Co, Sb—Zn—Co and Nb—Zn.

(Nonmagnetic Layer)

The inorganic powder used in the nonmagnetic layer is a nonmagnetic powder and can be selected from inorganic compounds, such as metal oxides, metal carbonates, metal sulfates, metalnitrides, metalcarbides or metal sulfides. Further, mixing of carbon black in the nonmagnetic layer can give known effects of not only lowering the surface electrical resistance (Rs) and the light transmittance, but also enabling the nonmagnetic layer to have the desired micro Vickers hardness. In addition, the carbon black contained in the lower layer can produce a lubricant storage effect. As to the kinds of carbon black capable of producing such effects, furnace black for rubber use, thermal black for rubber use, carbon black for color use and acetylene black can be used. It is appropriate that the kind of carbon black be selected so as to achieve characteristic optimization depending on the desired effects. In some cases, greater effects can be achieved by combined use of different kinds of carbon black. Known techniques on magnetic layer can be applied in selecting lubricants, dispersing agents, additives, solvents and dispersing methods for the nonmagnetic layer.

[Additives]

Additives used in the magnetic layer and the nonmagnetic layer are compounds having a head polishing effect, a lubricating effect, an anti-static effect, a dispersing effect or a plasticizing effect. Examples thereof include the compounds disclosed in WO98/35345.

Examples of a compound usable as lubricant agent include monobasic fatty acids containing 10 to 24 carbon atoms and metal salts thereof (e.g., Li, Na, K and Cu salts), mono-, di- or trifatty acid esters produced by reaction of 10–24C monobasic fatty acids with one kind of alcohol chosen from 2–12C monohydric to hexahydric alcohol compounds, fatty acid esters of polyalkylene oxide monoalkyl ethers, and fatty acid amides containing 8 to 22 carbon atoms. The fatty acids and alcohol compounds recited above may contain unsaturated bonds or may be branched compounds.

Examples of such fatty acids includes capric acid, caprylic acid, lauric acid, myristic acid, palmitic acid, stearic acid, behenic acid, oleic acid, elaidic acid, linolic acid, linolenic acid, and isostearic acid. Examples of the foregoing esters includes butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleate.

(Backing Layer)

In the backing layer, carbon black and an inorganic powder are preferably contained. In selecting a binder and various additives for the backing layer, the formulae for the magnetic layer and the nonmagnetic layer can be applied. The suitable thickness of the backing layer is from 0.1 to 1.0 μm, preferably from 0.4 to 0.6 μm.

(Support)

The support used for the magnetic tape is preferably a nonmagnetic flexible support. Examples of such a support include known films, such as films of polyesters (e.g., polyethylene terephthalate, polyethylene naphthalate), polyolefins, cellulose triacetate, polycarbonate, aromatic or aliphatic polyamide, polyimide, polyamideimide, polysulfone and polybenzoxazole. Of these films, polyethylene terephthalate film and polyimide film are preferred over the others. These support materials may undergo in advance corona discharge, plasma treatment, adhesion increase treatment, heat treatment and dust removal treatment.

It is appropriate to use a support material having an elasticity modulus of 630 kg/mm$^2$ (6.2 GPa) or below in the length direction and an elasticity modulus of 580 kg/mm$^2$ (5.7 GPa) or below in the width direction, preferably elasticity moduli of 550 kg/mm$^2$ (5.4 GPa) or below in both length and width directions.

(Production Method)

The magnetic layer and the nonmagnetic layer can be formed in a manner that their individual coating compositions are prepared by dissolving or dispersing ingredients for each layer in a solvent and coated successively on a support (web). In coating the compositions may be adopted a wet-on-wet method in which the magnetic layer is coated while the nonmagnetic layer is in a wet state, or a wet-on-dry method in which the magnetic layer is coated after the nonmagnetic layer is dried. The web coated and dried in the foregoing manner is subjected to appropriate treatment for orientation, calendering and then slit in tapes.

[Magnetic Tape Cartridge]

The present magnetic tape cartridge has a cartridge case accommodating a single reel wound with a magnetic tape so that the reel is rotatable, and uses the present leader tape as a leader tape which is spliced to the forward end of a magnetic tape and drawn from the cartridge case into a magnetic record playback unit while leading the magnetic tape.

The suitable thickness of the leader tape is 5 times or below, preferably three times or below, far preferably two times or below, that of the magnetic tape.

It is preferable that the length of the leader tape is not shorter than the sum of the length corresponding to at least three turns of the machine reel mounted in a magnetic record playback unit and the length of a running path extending from the aperture of the cartridge case to the machine reel.

Figure 4:
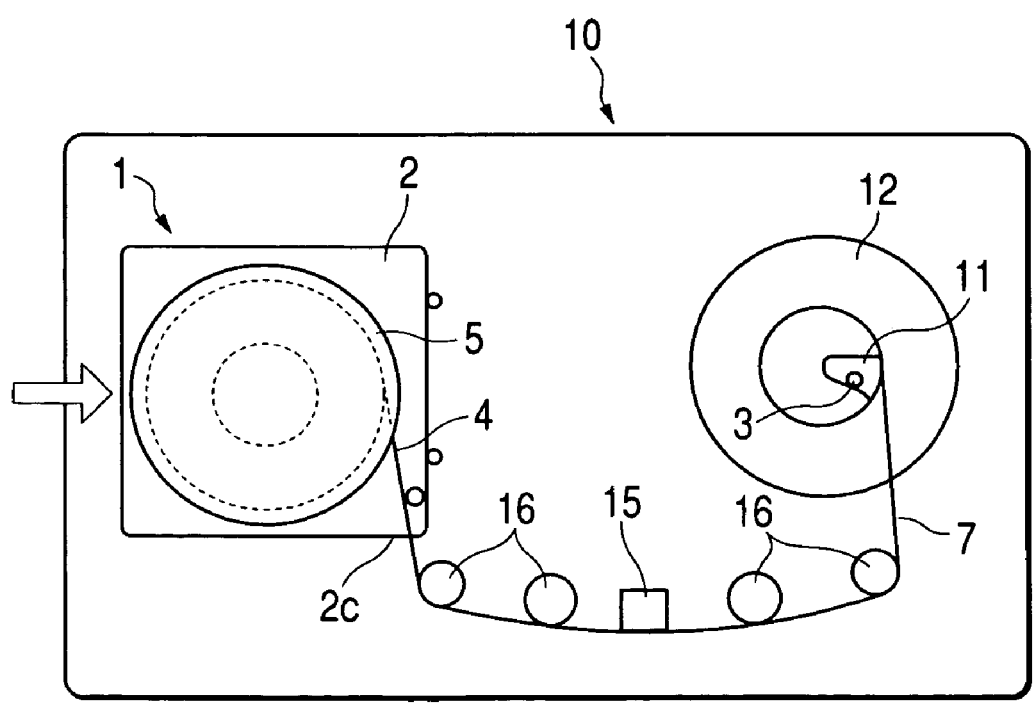
FIG. 4 is a schematic mechanical drawing of the magnetic tape cartridge loaded in a magnetic record playback unit.

Now, the invention is illustrated in detail on the basis of drawings. FIG. 1 is an oblique perspective figure showing a state in which the magnetic tape is drawn out from the magnetic tape cartridge, FIG. 2 is an oblique perspective figure showing a disassembled state of a leader pin-fixed section, FIG. 3 is a plan view of a leader tape-spliced part of the magnetic tape, and FIG. 4 is a schematic mechanical drawing of the magnetic tape cartridge loaded in a magnetic record playback unit. Incidentally, this mode for carrying out the invention is a case in which the leader pin is used as a leader member.

The magnetic tape cartridge 1 has a cartridge case 2 made up of an upper case 2a and a lower case 2b, which are screwed together. The cartridge case 2 accommodates a single reel 5 on which a magnetic tape 4 is wound so that the reel is rotatable. A leader tape 7, which is fixed to a leader pin 3 (a leader member) at the terminal thereof, is extended and spliced to the forward end of the magnetic tape 4. In one side wall of the cartridge case, an aperture section 2c for drawing out the magnetic tape 4 is formed. Closing and opening of the aperture section 2c is carried out with a slide door 6 to which a momentum in the closing direction is given by an elastic tool which is not shown in FIG. 1. When the magnetic tape cartridge 1 is not used, the terminal leader pin 3 is retracted and locked in a depressed holder 2d formed in the vicinity of the aperture 3 in a state that the magnetic tape 4 and the leader tape 7 are entirely wound on the reel 5. And the leader tape 7 is a leader tape formed in accordance with the invention.

Although it is not shown in FIG. 1, a center hole for a driving shaft of a magnetic record playback unit, by which the rotation of the reel 5 is driven, is made at the center of the lower case 2b. And the center part of the reel 5 is equipped with a rotation controlling mechanism (brake mechanism), which is not shown in the figure, for locking the rotation of the reel 5 when the cartridge is not used. In addition, a reel plate for sucking and holding a magneto rotation-driving device is installed on the underside and at the central part of the reel 5, and a reel gear engaging with a drive gear as a rotation driving device is implanted in the rim of the reel. Incidentally, the rotation controlling mechanism is put into release operation in a state that the reel gear engages with the drive gear, and thereby the reel 5 becomes free to rotate.

The leader pin 3 is a part for tape loading, and holds the magnetic tape 4, pulls it out and introduces it into the tape-running path laid inside a magnetic record playback unit 10 (as shown in FIG. 4) using the magnetic tape cartridge 1. By use of a clip 8 having a C-shape cross section, this leader pin is fixed to the terminal of the leader tape 7 extended and spliced to the forward end of the magnetic tape.

As shown in FIG. 2, the leader pin 3 has in its midsection a shaft-form clamp part 3a, which clamps the terminal of the leader tape 7 by slipping the clip 8 over the clamp part and securing it thereto. The top and the bottom of the clamp part 3a are combined with tabular flange parts 3b and 3b, respectively. Further, thin engaging parts 3c and 3c, which are engaged and held from the side of the record playback unit, are formed on both flange parts, respectively, so as to extend in the axial direction. Furthermore, on both the engaging parts are formed fixing parts 3d and 3d for case fixation. The clip 8 is a molded-resin product, and formed so as to have a length corresponding to that of the clamping part 3a of the leader pin 3 in the axial direction and a C-shape cross section by making a slit 8a extending along the entire length of the clamping part in the axial direction. The outside surface of the clip 8 opposite to the slit 8a was chamfered off to make a flat area 8b.

The leader tape 7 is spliced to the forward end of the magnetic tape in a state that one end of the leader tape 7 and the forward end of the magnetic tape are butt-joined and thereto a known splicing tape 7a is stuck (as shown in FIG. 3). In addition, as shown in FIG. 2, a reinforcing tape 9 may be stuck to the other end of the leader tape 7 in the vicinity of the leader pin-fixed region.

The magnetic tape cartridge 1 is loaded in a magnetic record playback unit 10 as shown in FIG. 4 and, at the same time as the loading, the slide door 6 commences an opening action and the aperture section 2c is opened. A leader block 11 installed in the unit moves and accesses to the aperture section 2c of the cartridge case 2, and holds the leader pin 3 in an engaged state, and further moves along the tape-running path while drawing out the leader tape together with the magnetic tape 4, and is fitted in the hub of a machine reel 12 placed inside the unit.

A magnetic head 15 is placed at an appropriate point of the tape-running path, and on both sides thereof a plurality of tape guides 16 are arranged. By driving the machine reel 12 to rotate, the magnetic tape 4 is made to run underneath the magnetic head 15. In this manner, playback of magnetic recording is performed.

Although the case where the leader pin 3 as a leader member fixes to the end of the leader tape 7 is illustrated in the above mode, the leader block may be designed so as to fix directly to the end of the leader tape 7. Alternatively, a different form of leader member may be attached. In any case, the leader member maybe structured so that it is engaged with a holding member from the magnetic record playback unit's part and draws out the leader tape 7.

EXAMPLES

Now, the invention will be illustrated in greater detail by reference to the following examples, but these examples should not be construed as limiting the scope of the invention.

Additionally, all parts in the following examples and comparative examples are by weight unless otherwise indicated.

Example 1

Production of Leader Tape

<Preparation of Coating Compositions>
Coating Composition for Upper Layer:

| Ferromagnetic metal powder | 100 parts |
|---|---| coercive force Hc: 128 kA/m (1600 Oe)
specific surface area determined by BET: 53 m$^2$/g
crystallite size: 160 Å
saturation magnetization σs: 130 A·m$^2$/kg
average major axis length: 130 nm
average aspect ratio: 6.5
pH: 9.3
Co/Fe: 5 atomic %
Al/Fe: 7 atomic %
Y/Fe: 2 atomic %
water-soluble Na: 5 ppm
water-soluble Ca: 1 ppm
water-soluble Fe: 1 ppm

| | |
|---|---|
| Magnetic material surface-treating agent (phenylphosphonic acid) | 3 parts |
| Vinyl chloride copolymer (MR-110, produced by ZEON CORP.) | 10 parts |

(—SO$_3$Na content: 5×10$^{-6}$ eq/g, polymerization degree: 350, epoxy group content: 3.5 wt % on a monomer basis)

| | |
|---|---|
| Polyesterpolyurethane resin (neopentyl glycol/caprolactone polyol/MDI = 0.9/2.6/1 (by weight), —SO$_3$Na content: 1 × 10$^{-4}$ eq/g) | 2.5 parts |
| α-Alumina (average grain size: 0.3 μm) | 10 parts |
| Carbon black (average particle size: 0.10 μm) | 1 parts |
| Butyl stearate | 1.5 parts |
| Stearic acid | 0.5 parts |
| Methyl ethyl ketone | 150 parts |
| Cyclohexanone | 50 parts |
| Toluene | 40 parts |

Coating Composition for Lower Layer:

| | |
|---|---|
| Nonmagnetic powder TiO$_2$ specific surface area determined by BET: 45 m$^2$/g | 90 parts | average grain size: 0.1 μm
pH: 6.5
water-soluble Na: 10 ppm
water-soluble Ca: 1 ppm

| | |
|---|---|
| Carbon black (produced by Mitsubishi Carbon Corporation) | 10 parts | average primary particle diameter: 16 nm
DBP oil absorption: 80 ml/100 g
pH: 8.0
specific surface area determined by BET: 250 m$^2$/g

| | |
|---|---|
| Vinyl chloride copolymer (MR-110, produced by ZEON CORP.) | 12 parts |
| Polyesterpolyurethane resin (neopentyl glycol/caprolactone polyol/MDI = 0.9/2.6/1 (by weight), —SO$_3$Na content: 1 × 10$^{-4}$ eq/g) | 5 parts |
| Butyl stearate | 1.06 parts |
| Stearic acid | 1.18 parts |
| Methyl ethyl ketone | 150 parts |
| Cyclohexanone | 50 parts |
| Toluene | 40 parts |

The ingredients of the coating composition for each of an upper layer and a lower layer were kneaded with a continuous kneader, and then dispersed with a sand mill. Each of the dispersions thus obtained was admixed with successive, 5 parts of polyisocyanate (Colonate L, a product of Nippon Polyurethane Industry Co., Ltd.), and 40 parts of methyl ethyl ketone, and then passed through a filter having an average pore size of 1 μm. Thus, the coating compositions for the upper layer and the lower layer were prepared.

Coating Composition for Forming Backing Layer:

| | |
|---|---|
| Fine-particle carbon black (BP-800, a product of Cabot Corporation, average particle size: 17 nm) | 100 parts |
| Coarse-particle carbon black (thermal black, a product of Cancarb Limited average particle size: 270 nm) | 10 parts |
| α-Alumina (hard inorganic powder) (average particle size: 200 nm, Mohs' hardness: 9) | 5 parts |
| Nitrocellulose resin | 140 parts |
| Polyurethane resin | 15 parts |
| Polyester resin | 5 parts |
| Dispersing agent: copper oleate | 5 parts |
| Copper phthalocyanine | 5 parts |
| Barium sulfate (precipitated) (BF-1, a product of Sakai Chemical Industry Co., Ltd., average particle size: 50 nm, Mohs' hardness: 3) | 5 parts |
| Methyl ethyl ketone | 1,200 parts |
| Butyl acetate | 300 parts |
| Toluene | 600 parts |

The ingredients of the coating composition for forming a backing layer were kneaded with a continuous kneader, and then dispersed with a sand mill. The dispersion thus obtained was admixed with successive, 40parts of polyisocyanate (Colonate L, a product of Nippon Polyurethane Industry Co., Ltd.), and 1,000 parts of methyl ethyl ketone, and then passed through a filter having an average pore size of 1 µm. Thus., the coating composition for the backing layer was prepared.

<Production of Leader Tape>

On a web-form polyethylene terephthalate (PET) support (thickness: 14.0 µm, Young's modulus in the length (MD) direction: 500 Kg/mm$^2$ (4.9 GPa), Young's modulus in the width (TD) direction: 500Kg/mm$^2$ (4.9GPa), center-line average surface roughness Ra on the upper layer coating side (cut-off value: 0.25 mm): 8 nm), the coating compositions for the upper layer and the lower layer were coated using a simultaneous coating technique so that the upper layer and the lower layer had dry thicknesses of 0.8 µm and 1.8 µm, respectively. Then, orientation processing was carried out by use of both cobalt magnet having a magnetic force of 300 mT and solenoid having a magnetic force of 150 mT while the upper layer was in a wet state. Thereafter, drying was performed to complete the upper layer formation.

Then, the coating composition for the backing layer was coated on the other side of the support (the side opposite to the upper layer side) so as to have a dry thickness of 0.5 µm, and dried to form the backing layer. Thus, a roll of leader tape provided with the upper layer on one side of the support and the backing layer on the other side of the support was obtained.

Further, the web was subjected to heat treatment by 5 minutes' running through a heating zone held at 110° C. while a tension of 1.5 Kg/m (14.7 N/m) was applied thereto.

Furthermore, the thus heat-treated roll underwent calendering treatment by being passed through a 7-stage calendering machine made up of heating metal rolls and elastic rolls formed by coating a thermosetting resin on core metal rods (temperature: 90° C., linear pressure: 300 Kg/cm (294 kN/m), speed: 300 m/min), and rewound under a tension of 5 Kg/m (49 N/m). Each of the heating metal rolls was made of hard chromium-plated chromiummolybdenum steel, and had a surface roughness Ra of 0.005 µm (cut-off value: 0.25 mm). The thermosetting resin of the elastic rolls was a product obtained by reaction of a bis (2-oxazoline) compound, an aromatic diamine and an epoxy compound.

The thus obtained roll was heat-treated at 50° C. for 48 hours. Then, the roll was slit into tapes in ½ inch width, and further underwent demagnetization by being passed through solenoid having a magnetic flux density of 300 mT.

<Making of Magnetic Tape Cartridge>

The ½ inch-wide magnetic tape obtained was used as a leader tape, and spliced to a commercially available LTO to make a magnetic tape cartridge. The magnetic tape with a length of 580 m was wound on the reel.

Example 2

A magnetic tape cartridge according to the invention was made in the same manner as in Example 1, except that the PET support used in producing the leader tape had a center-line average surface roughness Ra of 10 nm on the double layer-coated side and the amounts of butyl stearate and stearic acid used as ingredients for forming the lower layer of the leader tape were changed to 1.27 parts and 1.41 parts, respectively.

Comparative Example 1

A magnetic tape cartridge was made in the same manner as in Example 1, except that the amounts of butyl stearate and stearic acid used as ingredients for forming the lower layer of the leader tape were changed to 0.85 parts and 0.94 parts, respectively.

Comparative Example 2

A magnetic tape cartridge was made in the same manner as in Example 1, except that the upper layer alone was coated in producing the leader tape and the thickness thereof was changed to 2.6 µm.

Comparative Example 3

A magnetic tape cartridge was made in the same manner as in Comparative Example 2, except that the amount of stearic acid used as an ingredient for forming the upper layer of the leader tape was changed to 1.1 parts.

<Evaluations of Magnetic Tape Cartridges>

The thus made magnetic tape cartridges were each evaluated under the following measurement conditions. As to the evaluation environments, the temperature was 23±2° C. and the humidity was in the range of 40 to 60% RH.

(1) Load/Unload Test

The cycle of load and unload operations of each of the magnetic tape cartridges made in Examples 1 and 2 and Comparative Examples 1 to 3 was repeated 10,000 times by use of a modified LTO drive.

(2) Scratch on Leader Tape

After the cycle of load and unload operations was repeated 10,000 times, the surface of each leader tape was observed, and the scratch level was marked on a scale of 3.
3: No scratch was observed on the tape surface.
2: Scratches were observed on localized areas of tape surface.
1: Scratches were observed on the whole tape surface.

(3) Adhesion of Powder to Head Part

The surface of a magnetic head part was observed, and the level of powder adhesion was marked on a scale of 3.
3: No adhesion of powder was observed.
2: Localized adhesion of powder was observed.
1: Adhesion of powder was observed on the whole surface of the head part.

(4) Dropout

After the cycle of load and unload operations was repeated 10,000 times by use of the LTO-modified drive, signals were recorded while running a magnetic tape so as to make a round trip along the entire length of path.

A 10-meter signal-recorded portion of the magnetic tape spliced to each leader tape was subjected to magnetic development, and signal-lost spots were counted by observation under a microscope to determine the number of dropouts.

(5) Friction Force

The upper layer of each leader tape was brought into contact with a stainless pole at a winding angle of 180° under a tension of 50 g (T1), and the tension (T2) required for the leader tape to run at a speed of 3.3 cm/sec was measured before and after the load/unload operation.

(6) Depth of Scratch on Magnetic Surface

The upper layer surface of each leader tape was scratched on a diamond stylus having the following specifications while applying a load of 10 gf to the stylus and moving the stylus at a speed of 100 m/min. The depth of the thus made scratch was measured with a 3D profiler made by WYKO (an optical three-dimensional surface profilometer). Therein, a 245- by 245-pixel array detector and 40× magnification were adopted.

Diamond stylus (made by Shinto Kagaku)
shape: triangular pyramid, point angle: 90°, radius of curvature in the tip part: 0.1 mm.

TABLE 1

| | Lubricating ingredients in upper layer | | Lubricating ingredients in lower layer | | Surface Electrical resistance | | Ra | Friction force (T2) Load/Unload | | Depth of scratches in upper layer | | | Magnetic Tape Number of |
|---|---|---|---|---|---|---|---|---|---|---|---|---|---|
| | Butyl stearate | Stearic acid | Butyl stearate | Stearic acid | Upper layer ($\Omega$/sq) | Backing layer ($\Omega$/sq) | Upper layer (nm) | before | after | (nm) | Scratch | Head Powder adhesion | dropouts per 10 m |
| Example 1 | 1.5 parts | 0.5 parts | 1.06 parts | 1.18 parts | $5 \times 10^8$ | $8 \times 10^7$ | 3.5 | 100 g | 110 g | 280 | 3 | 3 | 1 |
| Example 2 | 1.5 parts | 0.5 parts | 1.27 parts | 1.41 parts | $9 \times 10^7$ | $8 \times 10^7$ | 5.0 | 100 g | 105 g | 290 | 3 | 3 | 1 |
| Compar. Example 1 | 1.5 parts | 0.5 parts | 0.85 parts | 0.94 parts | $8 \times 10^7$ | $8 \times 10^7$ | 5.6 | 103 g | 145 g | 270 | 2 | 2 | 15 |
| Compar. Example 2 | 1.5 parts | 0.5 parts | — | — | $5 \times 10^9$ | $8 \times 10^7$ | 8.0 | 105 g | 175 g | 260 | 1 | 1 | 20 |
| Compar. Example 3 | 1.5 parts | 1.1 parts | — | — | $1 \times 10^8$ | $8 \times 10^7$ | 6.3 | 100 g | 115 g | 320 | 1 | 1 | 20 |

Incidentally, although the layer composition on the upper surface of the support in each of the leader tapes of Comparative Examples 2 and 3 was a single layer, this layer is denoted as upper layer in Table 1.

As can be clearly seen from Table 1, the leader tapes produced in Examples 1 and 2 received no scratch, caused no powder adhesion to the head, and markedly reduced dropouts on the magnetic tape.

In Comparative Example 1, on the other hand, an increase in friction force was caused after the load/unload operation because the contents of butyl stearate and stearic acid in the lower layer-forming composition were reduced. As a result, scratches and powder adhesion increased to cause an increase of dropouts.

In the leader tape of Comparative Example 2, a single layer was provided and the lower layer was absent, so no lubricant was replenished. As a result, increases in friction force and dropouts were caused.

In the leader tape of Comparative Example 3, a single layer denoted as the upper layer was provided and the stearic acid content in the upper layer forming composition was heightened. As a result, the upper layer was plasticized and the scratches made thereon had deep depths. So the layer surface was susceptible to scratching, thereby increasing dropouts.

In accordance with the invention, the leader tape is designed so as to have an upper layer and a lower layer, or a double-layer structure, and besides, the lubricant added to the lower layer is increased by a specified amount, compared with the upper layer. As a result, even when repeated tape running is carried out, scratches on the leader tape surface are suppressed, and a magnetic tape cartridge reduced in dropouts can be provided.

This application is based on Japanese Patent application JP 2003-035412, filed Feb. 13, 2003, the entire content of which is hereby incorporated by reference, the same as if set forth at length.

What is claimed is:

1. A leader tape comprising:
   a support;
   an upper layer comprising a powder, a binder, and a lubricant; and
   a lower layer comprising a powder, a binder, and a lubricant which is at least 1.12 times as much as the lubricant of the upper layer;
   wherein the support, the lower layer, and the upper layer are in this order, the support is provided with a backing layer on the other side of the lower and the upper layers, and the upper layer and the backing layer each has a surface electrical resistance of $10^{10}$ $\Omega$/sq or below.

2. The leader tape according to claim 1, wherein the lubricant of the lower layer is 1.12 to 1.34 times as much as the lubricant of the upper layer.

3. The leader tape according to claim 1, wherein the lubricant is at least one selected from the group consisting of fatty acids, fatty acid esters and fatty acid amides.

4. The leader tape according to claim 1, wherein the support has an elasticity modulus of length direction of 630 kg/mm$^2$ or below, and a elasticity modulus of width direction of 580 kg/mm$^2$ or below.

5. The leader tape according to claim 1, which has a thickness of 15.2 to 20.0 μm.

6. The leader tape according to claim 1, wherein the upper layer has a thickness of 0.1 to 2.0 μm.

7. The leader tape according to claim 1, wherein the lower layer has a thickness of 1.0 to 3.0 μm.

8. The leader tape according to claim 1, wherein the support has a thickness of 12 to 16 μm.

9. The leader tape according to claim 1, wherein the upper layer has a center-line average surface roughness of 5.0 nm or below.

10. The leader tape according to claim 1, wherein at least one of the upper layer, the lower layer, and the backing layer contains an electrically conductive powder.

11. A magnetic tape cartridge comprising:
a cartridge case;
a reel provided in the cartridge case so that the reel is capable of rotating;
a magnetic tape wound on the real; and
a leader tape comprising: a support; an upper layer comprising a powder, a binder, and a lubricant; and a lower layer comprising a powder, a binder, and a lubricant which is at least 1.12 times as much as the lubricant of the upper layer; wherein the support, the lower layer, and the upper layer are in this order;
wherein one end of the magnetic tape is capable of being drawn from the cartridge, and the one end of the magnetic tape is connected to the leader tape, the support is provided with a backing layer on the other side of the lower and the upper layers, and the upper layer and the backing layer each has a surface electrical resistance of $10^{10}$ Ω/sq or below.

* * * * *